United States Patent [19]
Ruckwied

[11] Patent Number: 5,735,591
[45] Date of Patent: Apr. 7, 1998

[54] HEADLIGHT-LIGHT UNIT FOR VEHICLE

[75] Inventor: Heinz Ruckwied, Kusterdingen, Germany

[73] Assignee: Robert Bosch GmbH, Stuttgart, Germany

[21] Appl. No.: 599,649

[22] Filed: Feb. 12, 1996

[30] Foreign Application Priority Data

Mar. 4, 1995 [DE] Germany ............ 195 07 585.4

[51] Int. Cl.$^6$ .................................................. B10Q 1/04
[52] U.S. Cl. .................. 362/61; 362/80; 362/310
[58] Field of Search .................. 362/66, 80, 235, 362/237, 244, 310, 311, 61, 457

[56] References Cited

U.S. PATENT DOCUMENTS

| | | | |
|---|---|---|---|
| 5,172,972 | 12/1992 | Terao | 362/66 |
| 5,398,172 | 3/1995 | Kojima et al. | 362/80 |

FOREIGN PATENT DOCUMENTS

| | | | |
|---|---|---|---|
| 0200907 | 3/1986 | European Pat. Off. | |
| 755932 | 12/1933 | France | 362/235 |

Primary Examiner—Y. My Quach
Attorney, Agent, or Firm—Michael J. Striker

[57] ABSTRACT

A headlight-light unit for a vehicle comprises a headlight having a headlight housing with a headlight outlet opening and a headlight cover member covering the headlight outlet opening, a light adjoining the headlight and having a light housing with a light outlet opening and a light cover member closing the light outlet opening. The headlight cover member and the light cover member are formed as a single cover element, a frame-like element connecting the cover element with the headlight housing and having a portion which extends outwardly beyond the headlight housing and forms the light housing.

6 Claims, 1 Drawing Sheet

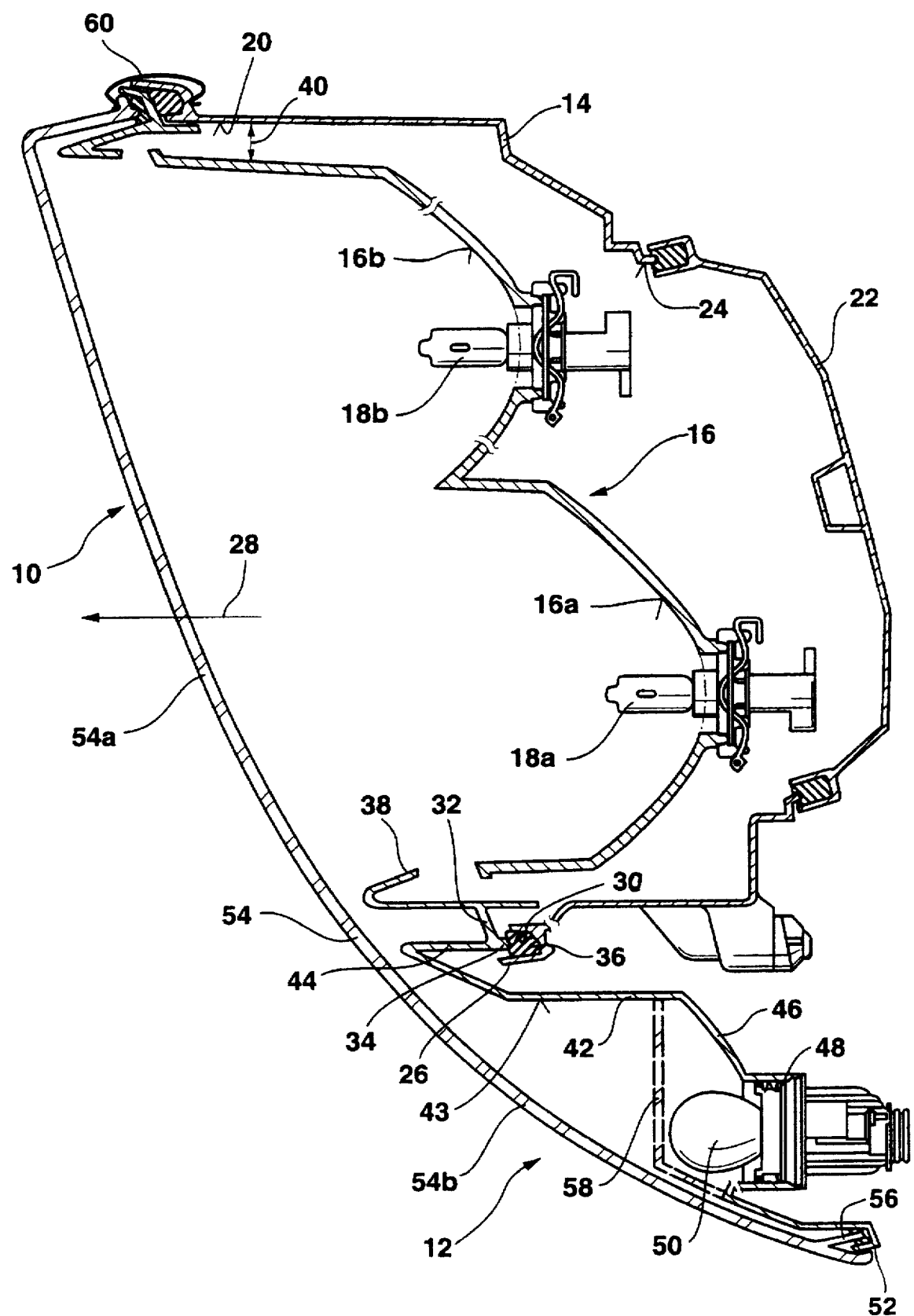

5,735,591

HEADLIGHT-LIGHT UNIT FOR VEHICLE

BACKGROUND OF THE INVENTION

The present invention relates generally to headlight-light units for vehicles.

Headlight-light units for vehicles are known in the art. One of such headlight-light units is disclosed in the European patent document EP 0 200 907 A1. This headlight-light unit has a headlight and a light arranged so as to adjoin the same. The headlight has a housing with a light outlet opening which is covered by a cover disc. The light has a separate housing with a light outlet opening which is covered by a separate cover disc. In view of this design, the headlight-light unit has many components, and the headlight and the light must be mounted individually. Moreover, mounting means are needed on the headlight housing and on the light housing in order to connect them with one another. Moreover, they must be formed so that the manufacturing tolerances of the components are compensated, which involves additional expenses. Generally speaking, the known headlight-light unit involves substantial manufacturing and mounting expenses.

SUMMARY OF THE INVENTION

Accordingly, it is an object of the present invention to provide a headlight-light unit of the above mentioned general type, which avoids the disadvantages of the prior art.

In keeping with these objects and with others which will become apparent hereinafter, one feature of the present invention resides, briefly stated, in a headlight-light unit for a vehicle with a headlight and a light adjoining the headlight, wherein the headlight has a housing with a light outlet opening covered by a cover disc, and the light has a housing with a light outlet opening covered by a cover disc, wherein in accordance with the present invention a single cover disc is provided for the headlight and for the light and is connected with the headlight housing by a frame-like element, and the frame-like element has a portion which extends outwardly beyond the headlight housing and forms the housing for the light.

When the headlight-light unit is designed in accordance with the present invention, it has a few components since no separate housing is needed for the light and no separate cover disc is needed as well. Moreover, the headlight-light unit is simple to mount since the special assembly of the headlight and the light is dispensed with.

In accordance with another feature of the present invention the frame-like element can have a circumferential flange in which the cover disc is received with a circumferential edge.

On the other hand, the cover disc can be mounted on the frame-like element and form with the same a premounted unit which is mountable on the headlight housing.

In the inventive unit also a reflector can be arranged adjustably, and a shutter can be formed in one piece with the frame-like element for at least partially covering a gap provided between the outer periphery of the reflector and the inner periphery of the headlight housing.

The portion of the frame-like element which forms the light housing can be coated on an inner side so as to be at least locally reflective, in accordance with another feature of the present invention.

The cover disc can be colorless. On the other hand, the cover disc in its region which covers the light outlet opening of the headlight housing can be colorless, while in its another region which covers the light outlet opening of the light housing it can be colored in a signal color of the light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a headlight-light unit in accordance with the present invention, in a horizontal longitudinal section.

DESCRIPTION OF THE PREFERRED EMBODIMENTS

A headlight-light unit in accordance with the present invention is utilized for a vehicle, in particular a motor vehicle. It has a headlight identified as a whole with reference numeral 10 and a light which is identified as a whole with reference numeral 12 and is located laterally near the headlight on the latter. The light 12 is formed as a front blinking light. The headlight-light unit is arranged in a receptacle of the chassis of the body of the vehicle and mounted in it in a not shown manner.

The headlight 10 has a housing 14 in which at least one reflector 16 is adjustably arranged. In the shown example the reflector 16 has a part 16a for a low beam and a part 16b arranged laterally near the part 16a and provided for high beam or fog light. A light source 18a, 18b is arranged correspondingly in the apex region of the reflector parts 16a and 16b. The light source can be formed as an intermittent lamp or a gas discharge lamp. The headlight housing 14 has a light outlet opening 20 at its front end and an opening 24 at its rear end which is closable with a cap 22. The light sources 18a and 18b can be available through the opening 24 for their exchange. The headlight housing 14 has a circumferential front edge 26 which surrounds the light outlet opening 20 and is provided with a groove 30 which opens in a light outlet direction 28. The headlight housing 14 is composed preferably of a synthetic plastic material. However, it can be composed of a different material.

A flame-like element 32 is mounted on a front edge 26 of the headlight housing 14. It has a circumferential edge 34 which engages in the groove 20. The frame-like element 32 is composed of synthetic plastic material and formed as an injection molded part. Preferably an elastically deformable sealing element 36 is inserted in the groove 30, and the frame-like element 32 abuts against the edge 34. The edge 34 extends starting from the groove 30, first a piece in the light outlet direction 28, then projects over the groove 30 outside inwardly, and extends then again in the light outlet direction 28. In the frame 32 a shutter 38 which is formed of one piece with the same and extends, starting from a front edge facing in the light outlet direction 28, opposite to the light outlet direction 28 toward the reflector 16. The shutter 38 conically narrows toward the reflector 16. The shutter 38 is coated on its inner side so as to be reflective, and covers a depth 40 provided between the outer periphery of the reflector 16 and the inner periphery of the headlight housing 14. The gap 40 is necessary to make possible an adjustment of the reflector in the headlight housing 14. However, its disadvantage is that it is visible from outside of the headlight housing 14.

The frame-like element 32 has a portion 42 which laterally extends over the headlight housing 14 and forms a housing for the light 12. The housing portion 42 of the frame-like element 32 is connected of one piece with the part of the frame 32 in the region of the headlight housing 14, through an edge 34 inserted in the groove 40 and being a part of a wall 44 extending in the light outlet direction 28. The housing portion 42 is provided on its front side with a light outlet opening 43 and on its rear side with a concavely curved rear wall 36. An opening 48 is formed in the apex region of the rear wall 46 so that a light source 50 for the light 12 can be inserted through this opening. At least the rear wall 46 of the housing portion 42 is reflectingly coated on its inner side. Preferably, the housing portion 42 is coated reflectingly on its whole inner side. The concavely curved rear wall 46 of the light housing 42 can be curved parabolically so that it substantially parallel reflects the light emitted by the light source 50. The rear wall 46 can be curved in a different way, so that the light emitted by the light source 50 can be reflected for producing a predetermined light distribution.

The frame-like element 32 has a flange 52 which over its whole periphery runs around the headlight housing 14 and the housing portion 42 and is open in the light outlet direction 28. The light outlet opening 20 of the headlight housing 14 and the light outlet opening 43 of the light housing 42 are covered with a one piece cover disc 54. The cover disc 54 has an edge 56 which faces opposite to the light outlet direction 28 and engages in the flange 52 of the frame 32. The cover disc 54 can be composed of synthetic plastic material or glass. It can be smooth or can be provided also with optical elements for deviating the light passing through the cover disc. It is also possible to form the cover disc 54 so that its region 54a which covers the light outlet opening 20 of the headlight housing 14 has different optical elements then the optical elements provided in its region 54b which covers the light outlet opening 43 of the light housing 42.

The cover disc 54 can be continuously colorless. The required signal color of the light beam emitted from the light 12 can be provided by the utilization of the light source 50 with a colored bulb, or by a color filter 58 arranged between the cover disc 54 and the light source 50 as shown in a broken line in the drawing. Alternatively, the cove disc 54 can be colorless in its region 54a which covers the light outlet opening 20 of the headlight housing 14, while its region 54a which covers the light outlet opening 43 of the light housing 42 can be colored in the signal color of the light 12.

The cover disc 54 is fixedly connected with the frame-like element 32. For example, its edge 56 can be glued in the flange 52 of the frame-like element 32. On the one hand the fixed connection can be provided by an arresting connection or by means of one or several clamps. The cover disc 54 together with the frame-like element 32 form a premounted structural unit which is then mounted on the headlight housing 14. The mounting of the unit composed of the frame-like element 32 and the cover disc 54 on the headlight housing 14 is performed also in a known manner. For example, the frame-like element 32 can be glued with the headlight housing 14. On the other hand, it can be connected with it by an arresting connection or, as shown in the drawing, by one or several clamps 60 which are distributed over the periphery of the headlight housing 14. At the side of the headlight housing 14 which faces away from the light housing 42, as well as on its upper and lower sides, the U-shaped clamp 60 engages with its one leg a step of the cover disc 54 and with its another leg a step of the headlight housing 14 and thereby fix the whole structural unit cover disc 54/frame-like element 32 on the headlight housing 14. At the side of the headlight housing 14 where the light housing 42 is arranged, the clamps 60 engage only the frame-like element 32 and the headlight housing 14. The mounting of the structural unit cover disc 54/frame-like element 32 on the headlight housing 14 can also be performed in a different manner, for example by screwing or glueing.

The headlight housing 14 can be taken over by a conventional headlight, so that the cover disc 54 is arranged only in the region of the light outlet opening 20 of the headlight housing 14, and the light is formed in a separate part. The cover disc 54 in the conventional headlight can be also mounted through a frame-like element of the headlight housing 14 which however does not have the portion 42 for forming the light housing. Thereby the headlight housing 14 can be used without any design changes both for the design of the headlight-light unit or in other words the conventional design with the separate light housing and light cover disc, and also for the above described design with the light housing 42 formed on the frame-like element 32 and the joint cover disc 54 for the headlight and the light.

It will be understood that each of the elements described above, or two or more together, may also find a useful application in other types of constructions differing from the types described above.

While the invention has been illustrated and described as embodied in a headlight-light unit for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A headlight-light unit for a vehicle, comprising a headlight having a headlight housing with a headlight outlet opening; a light adjoining said headlight and having a light housing with a light outlet opening; and a single cover element having a first portion which covers said headlight outlet opening so as to form a headlight cover member, and a second portion which covers said light outlet opening and forms a light cover member; a frame-like element connecting said cover element with said headlight housing and having a portion which extends outwardly of said headlight housing and forms said light housing, said frame-like element having a circumferential flange, said cover element having a circumferential edge received in said circumferential flange.

2. A headlight-light unit as defined in claim 1, wherein said portion of said frame-like element which forms said light housing has an inner side which is at least partially reflectingly coated.

3. A headlight-light unit as defined in claim 1, wherein said cover element is continuously colorless.

4. A headlight-light unit as defined in claim 1, wherein said first portion of said cover element is colorless, and said second portion of said cover element is colored in a signal color of said light.

5. A headlight-light unit for a vehicle, comprising a headlight having a headlight housing with a headlight outlet opening; a light adjoining said headlight and having a light housing with a light outlet opening; and a single cover element having a first portion which covers said headlight outlet opening so as to form a headlight cover member, and a second portion which covers said light outlet opening and forms a light cover member; a frame-like element connecting said cover element with said headlight housing and having a portion which extends outwardly of said headlight housing and forms said light housing, said cover element is mounted on said frame-like element and forms together with said frame-like element a premounted unit which is mounted on said headlight housing.

6. A headlight-light unit for a vehicle, comprising a headlight having a headlight housing with a headlight outlet opening; a light adjoining said headlight and having a light housing with a light outlet opening; and a single cover element having a first portion which covers said headlight outlet opening so as to form a headlight cover member, and a second portion which covers said light outlet opening and forms a light cover member; a frame-like element connecting said cover element with said headlight housing and having a portion which extends outwardly of said headlight housing and forms said light housing; and a reflector adjustably arranged in said headlight housing; and a shutter formed of one piece with said frame-like element, said shutter at least partially closing a gap provided between an outer periphery of said reflector and an inner periphery of said headlight housing.

* * * * *